(12) United States Patent
Dadheech et al.

(10) Patent No.: US 8,105,721 B2
(45) Date of Patent: Jan. 31, 2012

(54) MICROTEXTURED FUEL CELL ELEMENTS FOR IMPROVED WATER MANAGEMENT

(75) Inventors: Gayatri Vyas Dadheech, Rochester Hills, MI (US); Richard H. Blunk, Macomb Township, MI (US); Thomas A. Trabold, Pittsford, NY (US); Reena L. Datta, Rochester, NY (US); Keith E. Newman, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 913 days.

(21) Appl. No.: 11/696,237

(22) Filed: Apr. 4, 2007

(65) Prior Publication Data
US 2008/0248368 A1 Oct. 9, 2008

(51) Int. Cl.
*H01M 8/06* (2006.01)
(52) U.S. Cl. ........................................ 429/414
(58) Field of Classification Search .................. None
See application file for complete search history.

(56) References Cited

U.S. PATENT DOCUMENTS

| 6,291,093 | B1 * | 9/2001 | Kindler et al. | 429/34 |
| 2002/0132156 | A1 * | 9/2002 | Ruhl et al. | 429/40 |
| 2005/0255373 | A1 * | 11/2005 | Kimura et al. | 429/44 |
| 2006/0040164 | A1 * | 2/2006 | Vyas et al. | 429/34 |
| 2006/0046926 | A1 * | 3/2006 | Ji et al. | 502/101 |
| 2007/0190401 | A1 * | 8/2007 | Ueda et al. | 429/44 |

FOREIGN PATENT DOCUMENTS

| WO | WO2007/018185 | 2/2007 |
| WO | WO 2007018185 A1 * | 2/2007 |

* cited by examiner

*Primary Examiner* — Emily Le
*Assistant Examiner* — Michael Forrest

(57) ABSTRACT

Methods and materials to improve water management in a fuel cell by microtexturing fuel cell elements, including the separator plate and/or the gas diffusion media. A method of manufacturing a fuel cell includes a separator plate and/or a gas diffusion media that are microtextured. Selective ablation of material and stamping can impart microtexturing, where the microtexturing facilitates water management in the fuel cell.

2 Claims, 5 Drawing Sheets

100 μm

MICROTEXTURED FUEL CELL ELEMENTS FOR IMPROVED WATER MANAGEMENT

The present invention relates to fuel cells, and more particularly, to fuel cell elements involved in water management.

Fuel cells have been proposed as a power source to supply electrical energy for automobiles and other industrial applications. An exemplary fuel cell has a membrane electrode assembly (MEA) with catalytic electrodes and a proton exchange membrane (PEM) sandwiched between the anode and cathode. Gas diffusion media made of porous conductive material may be used on the cathode and anode side to improve cell operation. The MEA is sandwiched between a pair of electrically conductive contact elements which serve as current collectors for the anode and cathode.

A bipolar PEM fuel cell may include a plurality of MEAs stacked together in electrical series while being separated one from the next by an impermeable, electrically conductive contact element known as a bipolar plate or separator plate. The separator plate can have two working faces, one confronting the anode of one MEA and the other confronting the cathode on the next adjacent MEA in the stack, and each separator plate electrically conducts current between the adjacent cells. Contact elements at the ends of the stack are referred to as end, terminal, or collector plates. These terminal collectors contact a conductive element sandwiched between the terminal separator plate and the terminal collector plate.

The separator plates sandwiching the MEAs may contain an array of grooves or channels in the faces thereof that define a reactant gas flow field for distributing the fuel cell's gaseous reactants (i.e., hydrogen and oxygen/air) over the surfaces of the respective anode and cathode. These reactant gas flow fields generally include a plurality of lands that define a plurality of flow channels therebetween through which the gaseous reactants flow from a supply header at one end of the flow channels to an exhaust header at the opposite end of the flow channels.

Covering the reactant flow fields is a gas diffusion media serving several functions. One of these functions is the diffusion of reactant gases therethrough for reacting within the respective catalyst layer. Another is to diffuse reaction products, namely water, across the fuel cell. Additionally, the diffusion media must conduct electrons and heat between the catalyst layer and separator plate. In order to properly perform these functions, the diffusion media must be sufficiently porous.

Water management is an important concern in operation of fuel cells. For example, water is generated at the cathode based on the electrochemical reactions between hydrogen and oxygen occurring within the MEA. Water is needed for and is depleted by transport of protons from the anode through the PEM to combine with oxidant at the cathode. In addition, the proton conductivity of the PEM is heavily dependent on its state of hydration. When hydrated, the PEM possesses acidic properties that provide a medium for conducting protons from the anode to the cathode of the fuel cell. However, if the proton exchange membrane is not sufficiently hydrated, the acidic character diminishes, with commensurate diminishment of the desired electrochemical reaction of the cell.

Another problem in water management occurs as moisture mass transfer within the fuel cell establishes localized moisture gradients in gas diffusion media. In this regard, an imbalance within the plane of the proton exchange membrane interfacing to the gas diffusion media occurs as some areas in the plane of the membrane benefit from a higher level of moisture respective to other areas of the plane in operation. The localized imbalances in gas diffusion media moisture quality affect comparable differentiated moisture qualities in localized areas of the proton exchange membrane, resulting in differentiated efficiencies per local areas of the proton exchange membrane in generation of electricity from the cell.

Another complexity in water management is that all of the individual fuel cells within the assembled fuel cell stack, and all the channels within each individual separator plate, are connected to common inlet and outlet manifolds. Therefore, each reactant flow passage has the same total pressure drop. Water blockage in one channel thus diverts flow to neighboring channels such that the overall pressure drop is maintained. Similarly, if one separator plate of one cell contains a relatively large amount of liquid water, it may experience a "starving" condition whereby so much flow is diverted to neighboring cells that reaction stoichiometry cannot be maintained. Therefore, it is desirable to minimize the accumulation of liquid water in the channels of the separator plates, especially at low load where the reactant flows are low and thus less able to move water by forces of gaseous shear.

Water management strategies such as pressure drop, temperature gradients, and counter flow operation are used with some effect; however, improved water management would better increase performance and durability of the fuel cell. Accordingly, there exists a need for improvements that provide balanced hydration of the proton exchange membrane and that provide better transport of water to cool the fuel cell to prevent overheating, that equilibrate or reduce local moisture gradients, and that prevent flooding or saturation with liquid water.

SUMMARY

The present invention provides methods and materials to improve water management in a fuel cell by microtexturing fuel cell elements, including at least a portion of the separator plate and/or the gas diffusion media.

A method of manufacturing a fuel cell includes contacting a separator plate and a gas diffusion media to form a covered reactant gas flow field. The separator plate includes a plurality of lands that define a plurality of channels and the gas diffusion media includes a first surface region complementary to the plurality of lands of the separator plate and a second surface region complementary to the plurality of channels of the separator plate. The plurality of lands of the separator plate contacts the first surface region of the gas diffusion media. At least a portion of a surface of the plurality of channels of the separator plate and/or at least a portion of the second surface region of the gas diffusion media is microtextured.

In some aspects, at least a portion of the surface of the plurality of channels of the separator plate and/or of the second surface region of the gas diffusion media is microtextured by a process that includes focusing laser pulses to selectively ablate surface material thereby producing microtexturing comprising a plurality of projections of unablated surface material. In some cases, the projections of surface material may be about 1 micrometer to about 100 micrometers in each of height, length, and width.

In other aspects, the surface of the plurality of channels of the separator plate is microtextured by a process including focusing laser pulses to selectively ablate surface material, where the surface material comprises at least a portion of the surface of the plurality of channels of the separator plate, and the separator plate is formed of metal. The selective ablation of surface material produces microtexturing comprising multilevel roughness including projections and depressions about 0.1 micrometers to about 10 micrometers in each of height, length, and width.

In yet other aspects, a method of manufacturing a fuel cell includes microtexturing at least a portion of the plurality of channels of the separator plate and/or the second surface region of the gas diffusion media by a process comprising pressing a microtextured stamping plate onto the surface of the plurality of channels of the separator plate and/or the second surface region of the gas diffusion media.

Further aspects include a fuel cell comprising a separator plate having a plurality of lands that define a plurality of channels and a gas diffusion media including a first surface region complementary to the plurality of lands of the separator plate and a second surface region complementary to the plurality of channels of the separator plate. The plurality of lands of the separator plate contact the first surface region of the gas diffusion media to form a reactant gas flow field. The surface of the plurality of channels of the separator plate and/or the second surface region of the gas diffusion media is microtextured.

In some cases, the surface of the plurality of channels of the separator plate is coated with a hydrophilic polymer that is microtextured and/or the second surface region of the gas diffusion media is coated with a hydrophobic polymer that is microtextured. The hydrophilic polymer that is microtextured may have a contact angle that is reduced by at least about 30 degrees and the hydrophobic polymer that is microtextured may have a contact angle that is increased by at least about 30 degrees.

Superhydrophilic or superhydrophobic surfaces can, in theory, be created according to Wenzel's model or Cassie-Baxter's model by making highly rough surfaces on hydrophilic or hydrophobic materials, respectively. Wenzel, R. N., Ind. Eng. Chem., 1936, 28:988; Cassie, A. B. D. and Baxter, S., Trans. Faraday Soc., 1944, 40:546. The roughness creates a high surface area on the surface of the fuel cell element, thereby increasing the hydrophilic or hydrophobic character of the surface. Consequently, in operation of the fuel cell, the transport of water is enhanced.

The present technology affords several benefits relating to water management in a fuel cell. Microtexturing one or both of the separator plate and/or gas diffusion media to increase the respective hydrophilicity or hydrophobicity helps to optimize water management.

The microtextured separator plate may be made superhydrophilic to readily spread out liquid water within the channels thereby facilitating evaporation or movement via gas shear. The microtextured gas diffusion media may be superhydrophobic to resist build up of liquid water that could block transport of the reactant gases and water vapor into the gas diffusion media. Moreover, a superhydrophobic surface on the channel side of the diffusion media would minimize the force required to shear water droplets from the diffusion media into the channels. Consequently, the present technology can help provide balanced hydration of the proton exchange membrane, better transport of water to cool the fuel cell to prevent overheating, equilibration or reduction of local moisture gradients, and can prevent flooding or saturation with liquid water.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION

The following description is merely exemplary in nature of the subject matter, manufacture, and use of the teaching disclosed herein, and is not intended to limit the scope, application, or uses of any specific invention claimed in this application, or in such other applications as may be filed claiming priority to this application, or patents issuing therefrom.

The present invention provides methods and materials to improve water management in a fuel cell by microtexturing fuel cell elements including a separator plate and/or a gas diffusion media. A method of manufacturing a fuel cell includes contacting a separator plate and a gas diffusion media to form a covered reactant gas flow field. The separator plate includes a plurality of lands that define a plurality of channels to form a reactant gas flow field, while the gas diffusion media includes a first surface region, which is complementary to the plurality of lands of the separator plate, and a second surface region, which is complementary to the plurality of channels of the separator plate. The plurality of lands of the separator plate contacts the first surface region of the gas diffusion media, thereby forming a covered reactant gas flow field. At least a portion of the plurality of channels of the separator plate and/or the second surface region of the gas diffusion media is microtextured to improve water management.

Figure 1A:
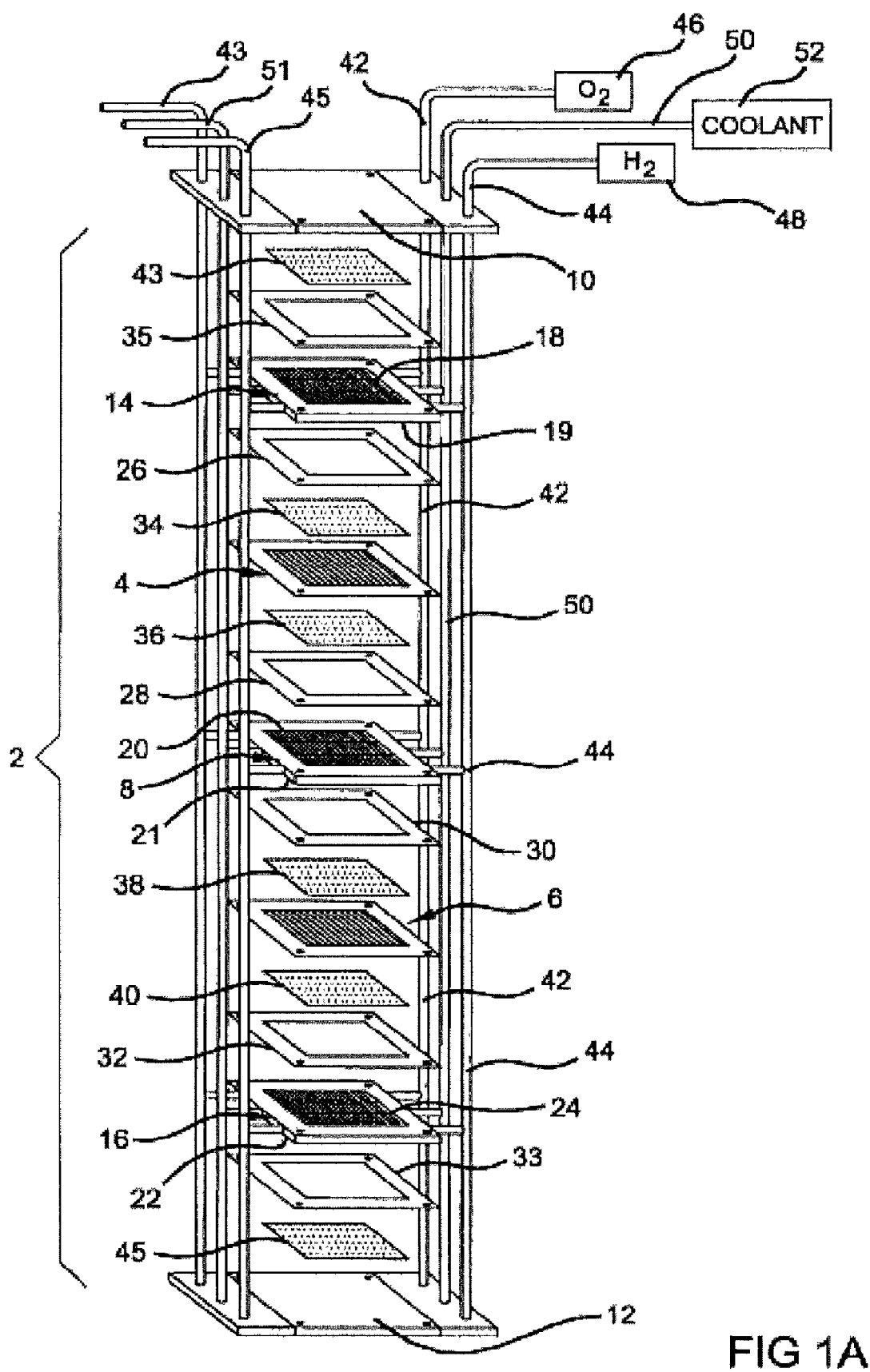
FIG. 1A is a schematic illustration of two MEAs in a liquid-cooled PEM fuel cell stack.
Figure 1B:
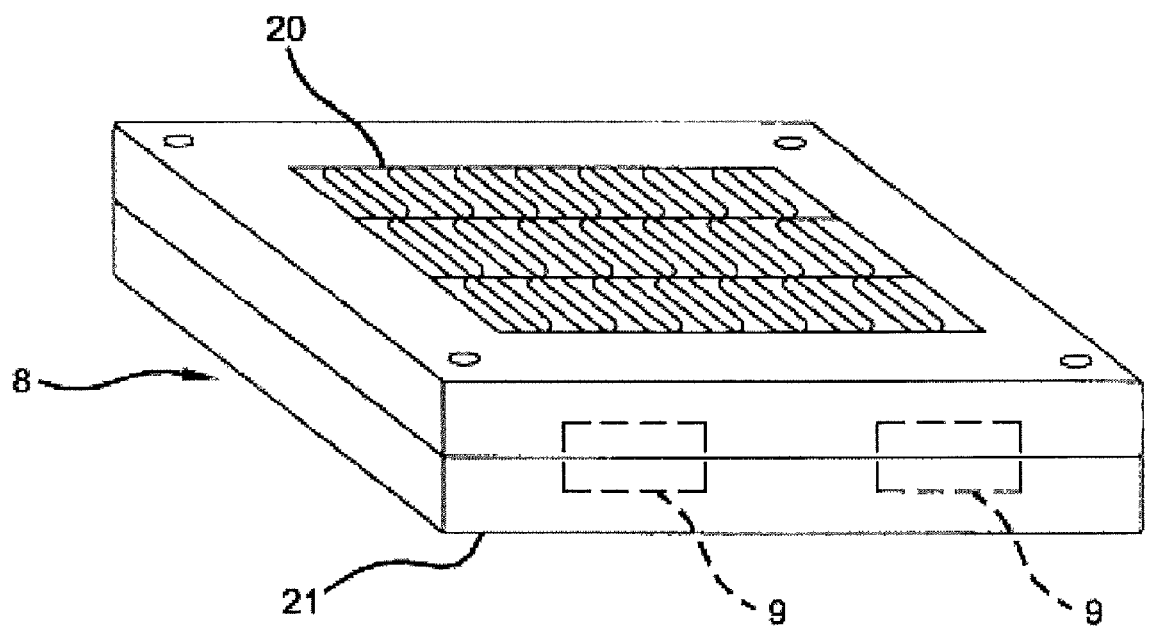
FIG. 1B is a partial view of the separator plate shown in FIG. 1A.

An exemplary embodiment of a fuel cell is shown in FIG. 1A, which includes a microtextured separator plate and/or a microtextured gas diffusion media according to the present teachings. Shown schematically in FIG. 1A are two individual proton exchange membrane (PEM) fuel cells connected to form a stack 2 having a pair of membrane-electrode-assemblies (MEAs) 4 and 6 separated from each other by an electrically conductive, liquid-cooled, bipolar separator plate 8. In a stack 2, a preferred bipolar separator plate 8 typically has two electrically active sides 20, 21 within the stack, each active side 20, 21 respectively facing a separate MEA 4, 6 with opposite charges that are separated, hence the so-called "bipolar" plate. In constructing separator plate 8, it is common to conductively join a pair of plates together, e.g., weld, braze, bond with conductive adhesive, so as to provide a coolant volume 9 between the plates as seen in FIG. 1B. As described herein, the fuel cell stack 2 is described as having conductive bipolar plates; however the present technology is equally applicable to separator plates having only a single fuel cell.

The MEAs 4, 6 and bipolar plate 8, are stacked together between clamping terminal plates 10 and 12, and end contact fluid distribution separator plates 14 and 16. The end separator plates 14, 16, as well as both working faces of the separator plate 8, contain a plurality of lands adjacent to grooves or channels on the active faces 18, 19, 20, 21, 22, and 24 for distributing fuel and oxidant gases (i.e., $H_2$ & $O_2$/air) to the MEAs 4, 6. Nonconductive gaskets or seals 26, 28, 30, 32, 33, and 35 provide seals and electrical insulation between the several components of the fuel cell stack. Conductive gas diffusion media 34, 36, 38, and 40 press up against the electrode faces of the MEAs 4, 6. Additional layers of conductive media 43, 45 are placed between the end contact fluid distribution plates 14, 16 and the terminal collector plates 10, 12 to provide a conductive pathway therebetween when the stack is compressed during normal operating conditions. The end contact separator plates 14, 16 press up against the diffusion media 34, 40 respectively, while the bipolar separator plate 8 presses up against the diffusion media 36 on the anode face of one MEA 4, and against diffusion media 38 on the cathode face of another MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient environment, and hydrogen to the anode from a methanol or gasoline reformer, or the like. Exhaust plumbing 43, 45 for both the anode and cathode sides of the MEAs are also provided. Additional plumbing 50 is provided for circulating coolant from a storage tank 52 through the bipolar separator plate 8 and end separator plates 14, 16 and out the exit plumbing 51. Hereinafter, the term "separator plate" refers to either a bipolar plate or an end contact separator plate. A separator plate may also be generally referred to as defining the entire assembly of two independent separator plates (with a space in between them respectively for coolant flow) or the single independent separator plate itself.

Figure 2:
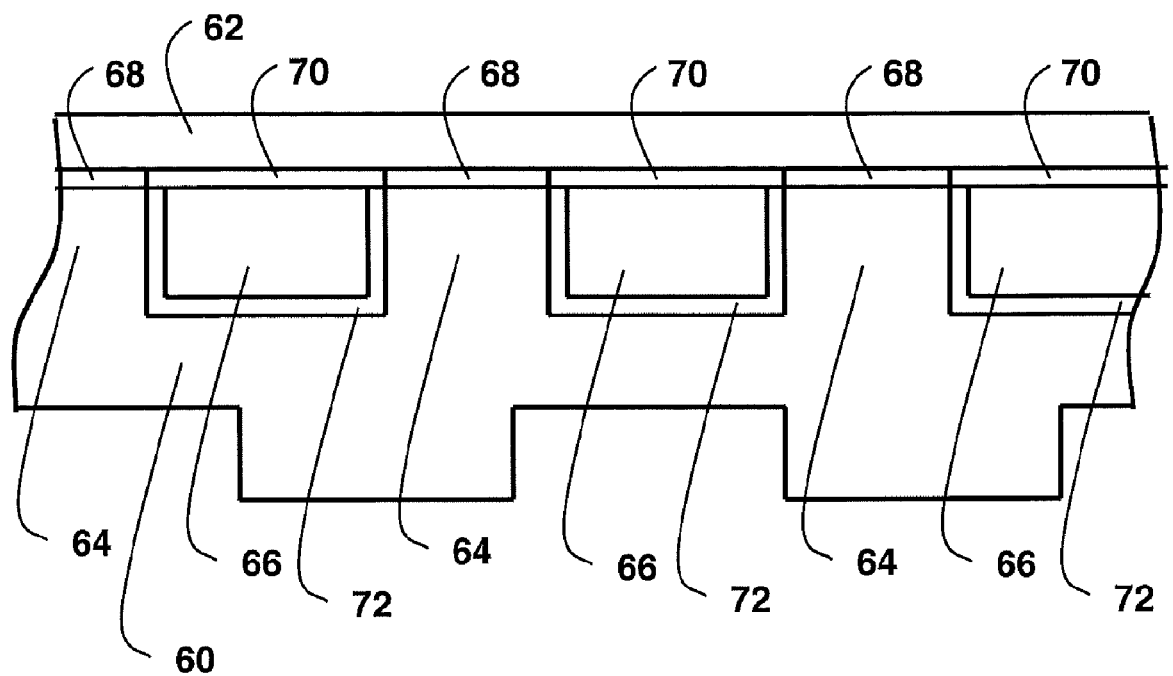
FIG. 2 is a section view of one embodiment of a separator plate covered with a gas diffusion media constructed in accordance with the present teachings.

Shown in cross-section in FIG. 2 is a portion of both the separator plate 60 and the gas diffusion media 62. The separator plate 60 and the gas diffusion media 62 are pressed together so that the gas diffusion media 62 covers the reactant gas flow field formed by the plurality of lands 64 that define a plurality of channels 66 in the separator plate 60. A first surface region 68 of the gas diffusion media 62 contacts the lands 64 of the separator plate 60, while a second surface region 70 covers the channels 66 of the separator plate 60. The channels 66 each have a channel surface 72, depicted in FIG. 2 as having a rectangular cross-section, but the channel surface 72 may comprise grooves or channels having various cross-section geometries, such as hemispherical, square, or triangular.

During operation of the fuel cell, water is generated at the cathode based on the electrochemical reactions between hydrogen and oxygen occurring within the MEA. Water may be transported within the fuel cell, in part, by reactant gas and water vapor flow through the channels of the reactant gas flow field on the separator plate. To facilitate water flow and management, at least a portion of the surface of the channels and/or the second surface region of the gas diffusion media are microtextured.

The separator plate channels are made hydrophilic so that liquid water will not block reactant gas and water vapor flow through the flow field. The hydrophilic surface spreads the liquid water out to a thin film so it may more readily evaporate or be transported by gas shear and does not fill the channel volume. The separator plate may be made of material that is hydrophilic, for example, such as a composite separator plate containing a hydrophilic polymer or a metal plate, such as a stainless steel plate. The hydrophilicity of the separator plate is increased by the microtexture. In some cases, the surface of the channels of the separator plate may be coated with a hydrophilic coating, such as a hydrophilic polymer coating, including acrylate-, phenolic-, polyimide-, epoxy-, polyurethane-, or nylon-based coatings. The hydrophilic coating is then microtextured to increase the hydrophilicity.

The surface of the gas diffusion media may be hydrophobic so that liquid water does not accumulate on the surface and block flow through the diffusion media. The entire surface of the gas diffusion media, the second surface region complementary to the plurality of channels of the separator plate, or a portion of the second region may be made hydrophobic. In some cases, either the entire gas diffusion media surface or just the second surface region or a portion of the second surface region may be coated with a hydrophobic coating, such as a hydrophobic polymer. An exemplary hydrophobic polymer is polytetrafluoroethylene. Other suitable hydrophobic polymers may be deposited, coated, or polymerized on the gas diffusion media surface, as well. The hydrophobic polymer is then microtextured to increase its hydrophobicity. Thus, the hydrophobicity of the gas diffusion media surface may be increased by the microtexture imposed on the hydrophobic polymer.

At least a portion of the surface of the separator plate channels or the surface of the gas diffusion media is microtextured to increase its hydrophilicity or hydrophobicity, respectively, or both. Microtexturing increases the surface area of the material and increases the hydrophilic or hydrophobic character of the microtextured material. Materials with contact angles of less than 90 degrees are hydrophilic. Microtexturing hydrophilic materials can reduce the contact angle by at least about 30 degrees, compared to non-textured material, and can even make materials superhydrophilic, wherein the resulting contact angle is less than about 20 degrees and can approach 0 degrees. Conversely, materials with contact angles of greater than 90 degrees are hydrophobic. Microtexturing hydrophobic materials can increase the contact angle by at least about 30 degrees, compared to non-textured material, and can even make materials superhydrophobic, wherein the resulting contact angle is greater than about 160 degrees and can approach 180 degrees. The contact angles of materials before and after microtexturing may be determined using the sessile drop method, for example, or other methods generally known in the art.

Microtexturing the surface of the channels or the surface of the gas diffusion medium may be accomplished using one or more processes including: mechanical processes, such as grinding, blasting, pressing, and engraving; lithographic processes, such as chemical, electrochemical, and ion beam; coating processes, such as physical vapor deposition, chemical vapor deposition, electrochemical deposition, and pulsed laser deposition; and energy beam processes, such as laser beam, electron beam, and electrical discharge.

Microtexturing using a laser beam process can produce topographical features with high precision that can be created on almost any metal, glass, ceramic, or polymer. Focusing laser pulses allows selective ablation of surface material to produce various types of microtexturing. For example, selective ablation using laser pulses can produce surface depressions surrounded by a smooth rim or solidified melt of the surface material, without the need to physically contact the material. Topography of the pores or depressions is reproducible and can be controlled by varying the interaction parameters, including beam power, intensity distribution, pulse shape, and pulse duration. Laser processing can be carried out either through direct focusing on the target surface, or through using a mask. By adjusting the incident energy and the time of interaction between the laser radiation and the target surface, actions ranging from heating of the surface material to very accurate ablation of the surface material can be selected without affecting the surrounding surface. For example, ultrashort laser pulses may be used for precise heating or ablation without affecting adjacent surface material, where micrometer scale and even nanometer scale structures may be produced.

A solid state laser or a gas laser (excimer) may be used to produce microtexturing. In some cases, a solid state laser may be advantageous because gas lasers may involve toxic gases, such as fluorine, and can be more expensive than solid state lasers. A Q-switch-operated Nd:YAG laser or Ti doped sapphire laser may be used. A systematic investigation using various pulse energies, pulse numbers, focusing systems, and laser plasma interactions can identify parameters necessary to microtexture the surface of a particular material. Microtextures may be characterized using an optical interferometer (WYKO Corp., Tuscon, Ariz.) and by scanning electron microscopy.

In some cases, laser-based ablation may employ a nanosecond laser system with a wavelength from about 1200 to about 2000 nm, energies from about 0.01 to about 0.50 mJ, and a pulse duration of about 5 to about 500 nanoseconds. These parameters may be used to produce a range of nanotextured to microtextured surfaces to affect the wetting behavior of carbon steel, stainless steel (SS) or polymer coated SS separator plates, gas diffusion media, and stamping plate materials.

Figure 3:
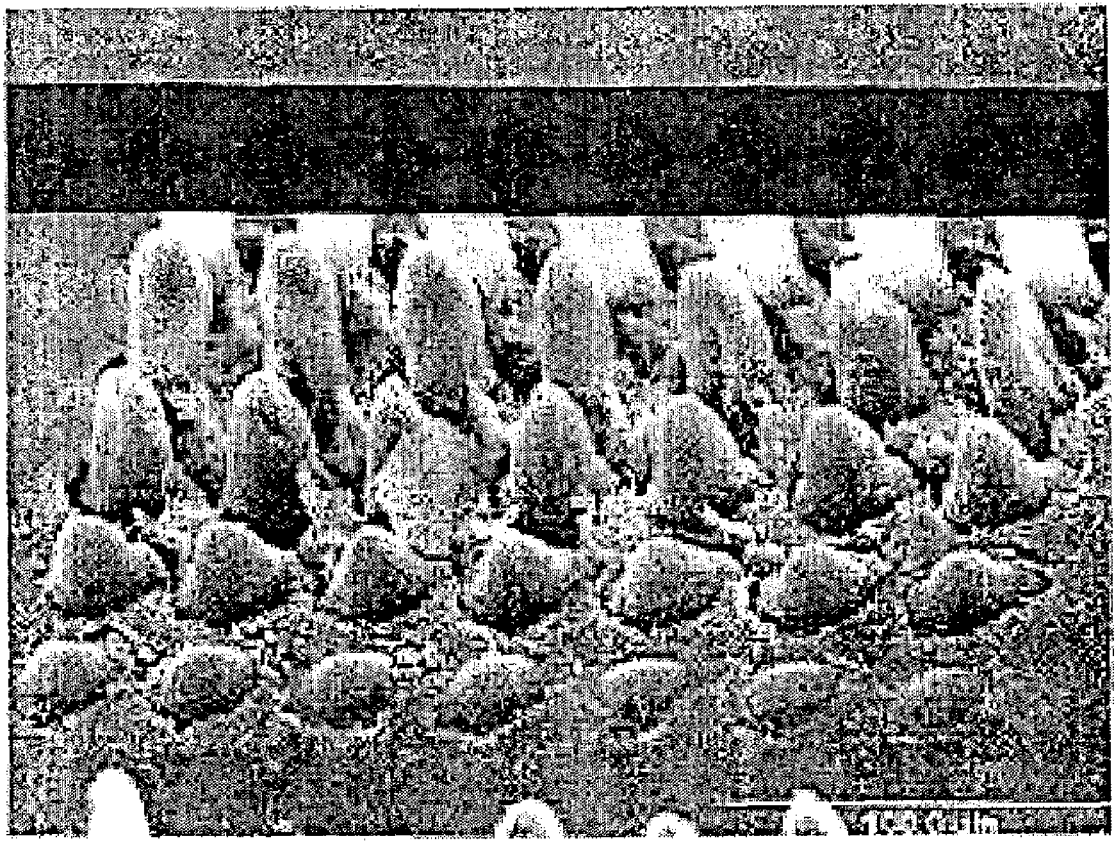
FIG. 3 is a photomicrograph of one embodiment of microtexturing constructed in accordance with the present teachings.
Figure 3:

Using laser pulses to selectively ablate surface material can produce microtextures comprising micrometer scale structures down to nanometer scale structures. In some cases, the microtexturing may include a plurality of projections of surface material that has not been wholly ablated. The projections of surface material may be about 1 micrometer to about 100 micrometers in each of height, length, and width. Thus, the projections include all height, length, and width dimensions continuous from about 1 micrometer to about 100 micrometers. The projections may include arrays of bumps, pyramids, cylinders, cones, square or rectangular blocks, and other geometric shapes. A photomicrograph of an exemplary microtexture is shown in FIG. 3 along with a scale of 100 micrometers. FIG. 3 shows how selective ablation of surface material may leave projections of unablated material of varying heights. While FIG. 3 illustrates generally cylindrical projections, any of the aforementioned arrays of shapes or combinations of shapes may be produced.

The microtexturing may also include multilevel roughness including projections and depressions about 0.1 micrometers to about 10 micrometers in each of height, length, and width. The multilevel roughness includes all height, length, and width dimensions continuous from about 0.1 micrometers to about 10 micrometers. The projections and depressions associated with multilevel roughness include texture features having both micrometer dimensions and texture features having nanometer dimensions. For example, multilevel roughness may comprise: (a) projections from about 1 micrometer to about 10 micrometers in each of height, length, and width; and/or (b) depressions from about 1 micrometer to about 10 micrometers in each of depth, length, and width; while at the same time having (c) projections from about 100 nanometers to about 1 micrometer in each of height, length, and width; and/or (d) depressions from about 100 nanometers to about 1 micrometer in each of depth, length, and width. In some cases, the multilevel roughness microtexturing may be employed on at least a portion of the surface of the channels of the separator plate, where the separator plate is made of metal.

Figure 4A:
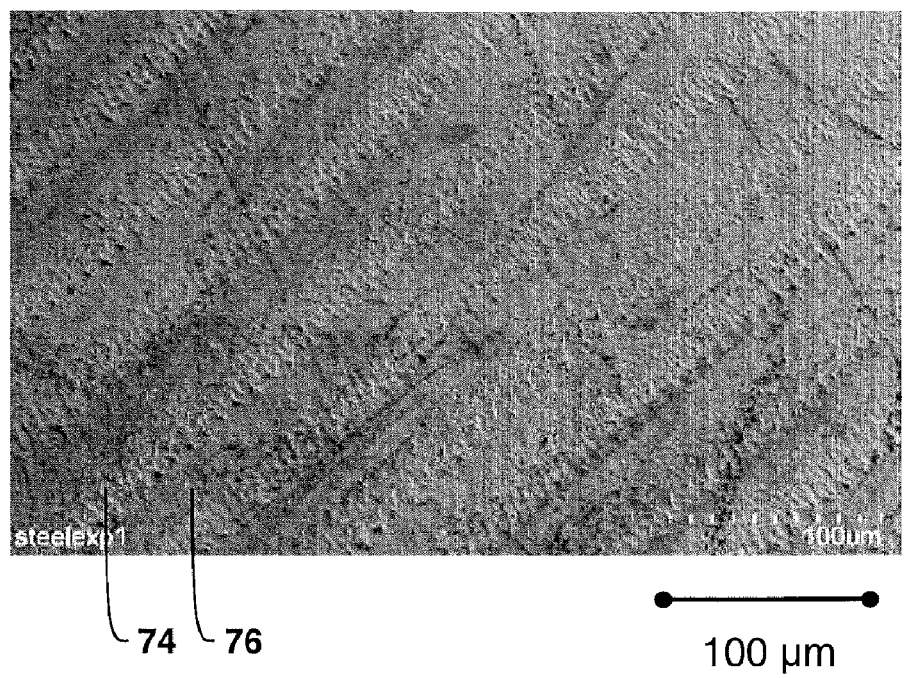
FIG. 4A is a photomicrograph of one embodiment of microtexturing of a stainless steel separator plate constructed in accordance with the present teachings showing a scale of 100 micrometers.
Figure 4B:
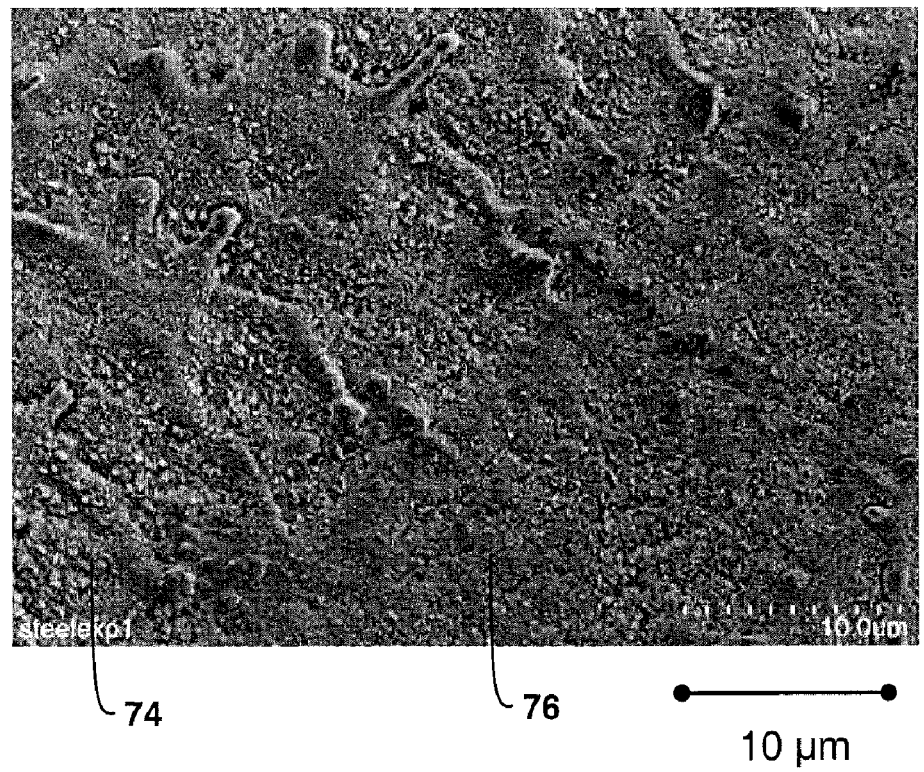
FIG. 4B is a photomicrograph showing a closer view of the embodiment in FIG. 4A showing a scale of 10 micrometers.

A photomicrograph of an exemplary microtexture comprising multilevel roughness formed on a stainless steel separator plate is shown in FIG. 4A along with a scale of 100 micrometers. Visible in FIG. 4A are alternating microtextured regions 74 and non-textured regions 76. FIG. 4B shows a closer view of a microtextured region 74 and non-textured region 76, on a scale of 10 micrometers.

Microtexturing may also be formed on at least a portion of the surface of the separator plate channels and/or the second surface region of the gas diffusion media by pressing a microtextured stamping plate onto the surface of the respective fuel cell element. Pressing using a stamping plate may impart microtexturing comprising the inverse of the microtexturing of the stamping plate. For example, the microtexturing on the stamping plate may comprise projections about 10 to about 100 micrometers in each of height, length, and width. Upon pressing this stamping plate onto the surface of the fuel cell element (e.g., the surface of the channels of the separator plate or the second surface region of the gas diffusion media), the microtexturing of the stamping plate may impart an impression on the fuel cell element surface comprising a plurality of depressions about 10 to about 100 micrometers in each of depth, length, and width. Likewise, stamping plates with microtexturing comprising multilevel roughness including projections and depressions about 0.1 micrometers to about 10 micrometers in each of height, length, and width may be used to impart similar microtexturing onto the surface of fuel cell elements.

Microtextured stamping plates may be produced using the various texturing processes described herein, including laser beam discharge. The laser pulses may be focused on the stamping plate surface to selectively ablate surface material to produce the microtexturing. For example, the microtextured stamping plate may be pressed onto a stainless steel separator plate to microtexture the separator plate. In this way, a single microtextured stamping plate may be used to form multiple microtextured separator plates. The same method could likewise be applied to form multiple microtextured gas diffusion media.

The examples and other embodiments described herein are exemplary and not intended to be limiting in describing the full scope of materials and methods of this technology. Equivalent changes, modifications and variations of specific embodiments, materials, compositions and methods may be made within the scope of the present technology, with substantially similar results.

What is claimed is:
1. A method of manufacturing a fuel cell comprising:
contacting a separator plate with a gas diffusion media to form a covered reactant gas flow field;
the separator plate including a plurality of lands that define a plurality of channels having a surface; and
the gas diffusion media including a first surface region that contacts the plurality of lands of the separator plate and a second surface region complementary to the plurality of channels of the separator plate;

wherein at least a portion of the surface of the plurality of channels of the separator plate is coated with a hydrophilic polymer that is microtextured by a process comprising:

focusing laser pulses to selectively ablate surface material thereby producing microtexturing comprising multilevel roughness including projections and depressions about 0.1 micrometers to about 10 micrometers in each of height, length, and width; and wherein the surface material comprises the surface of the plurality of channels of the separator plate.

2. A method of manufacturing a fuel cell according to claim 1, wherein either only the second surface region or a portion of the second surface region is coated with a hydrophobic polymer that is microtextured by focusing laser pulses to selectively ablate surface material thereby producing microtexturing comprising multilevel roughness including projections and depressions about 0.1 micrometers to about 10 micrometers in each of height, length, and width.

* * * * *